| United States Patent [19] | [11] 3,941,730 |
| --- | --- |
| Solenberger | [45] Mar. 2, 1976 |

[54] POLYVINYL ALCOHOL MICROGEL PRECURSOR BLENDS

[75] Inventor: John Carl Solenberger, Wilmington, Del.

[73] Assignee: E. I. Du Pont de Nemours and Company, Wilmington, Del.

[22] Filed: July 9, 1974

[21] Appl. No.: 486,899

Related U.S. Application Data

[63] Continuation-in-part of Ser. No. 259,665, June 5, 1972, abandoned.

[52] U.S. Cl. ..... 260/17 R; 260/17.4 ST; 260/91.3 R
[51] Int. Cl.²... C08L 29/04; C08L 1/32; C08L 3/02
[58] Field of Search... 260/17 R, 8, 91.3 R, 17.4 ST

[56] References Cited
UNITED STATES PATENTS

| | | | |
|---|---|---|---|
| 3,318,856 | 5/1967 | Deyrup | 260/91.3 |
| 3,492,250 | 1/1970 | Deyrup | 260/2.5 |
| 3,498,869 | 3/1970 | Murakami et al. | 260/17 R |
| 3,652,542 | 3/1972 | Hjermstad et al. | 260/17.4 ST |

*Primary Examiner*—Joseph L. Schofer
*Assistant Examiner*—Peter F. Kulkosky

[57] ABSTRACT

Stable, fluid polyvinyl alcohol-containing microgels in water having a Brookfield viscosity of 1.15 to 1000 centipoises may be prepared more economically from a dry blend which comprises (A) a polymer mixture consisting of at least about 0.5% by weight of polyvinyl alcohol and one or more polysaccharide selected from the group consisting of up to about 99.5% by weight of starch and up to about 33% by weight of sodium carboxymethylcellulose, said polyvinyl alcohol having a Hoeppler viscosity of about 4 to 150 centipoises and having at least about 50 mole percent of the monomeric units present as vinyl alcohol units, (B) water-soluble, solid titanium salt of a hydroxy carboxylic acid of 2 to 10 carbon atoms in an amount which provides about 0.05 to 10 parts by weight of tetravalent titanium ions per 100 parts of polymer mixture, and (C) about 0.05 to 20 parts by weight of water-soluble, solid hydroxy carboxylic acid of 2 to 10 carbon atoms per 100 parts of polymer mixture.

7 Claims, No Drawings

POLYVINYL ALCOHOL MICROGEL PRECURSOR BLENDS

CROSS-REFERENCE TO RELATED APPLICATION

This is a continuation-in-part application of Ser. No. 259,665, filed June 5, 1972, now abandoned.

BACKGROUND OF THE INVENTION

1. Field of the Invention

This invention relates to polyvinyl alcohol microgels and, more particularly, to dry precursor blends which may be used to prepare polyvinyl alcohol microgels.

2. Description of the Prior Art

Certain materials such as starch, sodium carboxymethylcellulose, sodium alginate, and polyvinyl alcohol, with or without the addition of clay, have been used as surface sizes for paper and paperboard. By "surface size" is meant a material which is applied to the surface of the paper or paperboard, thereby forming a barrier which prevents or retards wicking and adsorption of ink and other fluids into the paper or paperboard. Surface sizes are to be distinguished from internal sizes which are added in the process of making the sheet.

Although polyvinyl alcohol is many times more expensive than starch on a per pound basis, it has been shown that polyvinyl alcohol can perform as well as, or in many cases better than, starch as a surface size for paper or paperboard on an equal cost basis. However, in most use areas the improvement in performance has not been sufficient to cause former starch users to switch to polyvinyl alcohol. At present polyvinyl alcohol is definitely preferred to starch only in specialty areas where quality is important.

There is evidence that polyvinyl alcohol solutions readily penetrate into paper and paperboard. It is felt that even better performance for polyvinyl alcohol would be demonstrated if its "hold out" characteristics could be improved; that is, if penetration of polyvinyl alcohol size solutions into paper and paperboard could be substantially reduced or eliminated.

It is known that polyvinyl alcohol can be gelled by the addition of various gelling agents such as Congo Red, Direct Orange 8 (Colour Index 22120), Direct Green 12 (Colour Index 30290), borax, boric acid, and various compounds of aluminum, chromium, copper, iron, titanium, vanadium and zirconium. In U.S. Pat. Nos. 2,720,468; 3,318,856; and 3,492,250 the use of various organo-titanium complexes to gel polyvinyl alcohol is taught. Since these gels are amorphous-to-rigid solids they are not useful as surface sizes for paper or as textile warp sizes.

In U.S. Pat. No. 3,318,856, Alden J. Deyrup discloses the use of a dry blend containing titanium oxalate to prepare solid gels of polyvinyl alcohol. It is stated that the dry blend must be dissolved in water at a pH of about 6. This acidic pH may be obtained by the addition of certain acids. It is further stated that acids which form complexes or insoluble precipitates with tetravalent titanium, such as citric acid, should not be used.

U.S. Pat. No. 3,318,856 also teaches a system wherein polyvinyl alcohol is present with two different polyvinyl alcohol gelling agents, one gelling agent reinforcing the other. In Example 3 of said patent boric acid functions as the initial gelling agent. Tetravalent titanium, present as potassium titanium oxalate, is the primary gelling agent used to form the rigid polyvinyl alcohol based foam described in Example 3 which has a Brookfield viscosity in excess of 2000 centipoises. The gelled skin formed in minutes on exposure to air also has a Brookfield viscosity in excess of 2000. Deyrup U.S. Pat. No. 3,492,250 in column 4, lines 48 to 65, explains the function of two polyvinyl alcohol gelling agents, including boric acid.

Deyrup U.S. Pat. No. 3,492,250, in Example 4, discloses in a solution containing polyvinyl alcohol the presence of a polysaccharide thickener (Abbott Laboratories B 1459) together with Congo Red as the gelling agent. The solution of Example 4 does not contain a tetravalent titanium compound and the polysaccharide is a xanthan gum as disclosed in Whistler and Be-Miller, Industrial Gums, second edition, Academic Press, New York, VII, 1. History on page 486, 1973. A repeat of Example 4 shows that the xanthan gum polysaccharide does not crosslink with the Congo Red gelling agent present in the solution. The Brookfield viscosity at 60 rpm of the solution of Example 4 containing Congo Red was found to be 70 centipoises while the Brookfield viscosity at 60 rpm of a solution without Congo Red was found to be 73 centipoises.

In a copending application of Alden J. Deyrup, Ser. No. 259,552, filed June 5, 1972, polyvinyl alcohol microgels are claimed which exhibit improved hold out characteristics over aqueous polyvinyl alcohol solutions. These microgels are stable fluids comprising water and polyvinyl alcohol partially crosslinked with tetravalent titanium ions and having a Brookfield viscosity of about 1.15 to 2000 centipoises. The polyvinyl alcohol in these microgels is crosslinked sufficiently to increase the viscosity of the aqueous polyvinyl alcohol solution from which they are derived by at least about 15 percent, but insufficiently to increase the viscosity above about 2000 centipoises. This intermediate amount of crosslinking is referred to herein as partial crosslinking. It is believed that these microgels are entanglements of partially cross-linked polyvinyl alcohol chains possessing colloid-like properties dispersed in water.

In my copending application, Ser. No. 486,900, filed July 9, 1974, polyvinyl alcohol-polysaccharide microgels are claimed which provide sized paper having improved printing quality over the same paper sized with the polyvinyl alcohol microgels claimed in Deyrup U.S. Pat. application Ser. No. 259,552.

The microgels described in these two copending patent applications are prepared by partially crosslinking an aqueous solution of polyvinyl alcohol or a mixture of polyvinyl alcohol and one or more polysaccharide selected from the group consisting of starch and sodium carboxymethylcellulose using a titanium complex. Since the resulting microgels contain a large amount of water, it is not economical to transport them long distances. Moreover, they should be prepared only a short time before they are to be used, since they may not be stable for more than several days. Accordingly, it is preferred that these microgels be supplied on a commercial basis as a dry blend of microgel precursor ingredients. For example, polyvinyl alcohol can be dry mixed with a suitable solid titanium complex to form the commercial product. When ready for use, this blend is dissolved in water whereupon the microgel is formed.

SUMMARY OF THE INVENTION

It has now been discovered that when preparing stable, fluid polyvinyl alcohol-containing microgels in water having a Brookfield viscosity of 1.15 to 1000 centipoises from titanium salts of hydroxy carboxylic acids, more economical use of the titanium ion can be achieved, contrary to what would be suggested by the teachings of the above-cited patents to Alden J. Deyrup, by preparing a dry blend containing a hydroxy carboxylic acid such as citric acid. The dry precursor blends of this invention comprise (A) polymer mixture consisting of at least about 0.5 percent by weight of polyvinyl alcohol and one or more polysaccharide selected from the group consisting of up to about 99.5 percent by weight of starch and up to about 33 percent by weight of sodium carboxymethylcellulose, said polyvinyl alcohol having a Hoeppler viscosity of about 4 to 150 centipoises and having at least about 50 mole percent of the monomeric units present as vinyl alcohol units, (B) water-soluble, solid titanium salt of hydroxy carboxylic acid of 2 to 10 carbon atoms in an amount which provides about 0.05 to 10 parts by weight of tetravalent titanium ions per 100 parts of said polymer mixture, and (C) about 0.05 to 20 parts by weight of water-soluble, solid hydroxy carboxylic acid of 2 to 10 carbon atoms per 100 parts of said polymer mixture.

DETAILED DESCRIPTION OF THE INVENTION

The dry blends of this invention contain as their primary component a polymer mixture consisting of polyvinyl alcohol and one or more polysaccharide such as starch or sodium carboxymethylcellulose. The term "polyvinyl alcohol", as used throughout the specification and claims, refers to the product obtained by replacing all or a portion of the acyl groups in a polyvinyl ester with hydroxyl groups. Well-known methods of preparing polyvinyl alcohol include the hydrolysis, alcoholysis or saponification of a polyvinyl ester. Suitable polyvinyl esters include polyvinyl formate, polyvinyl acetate, polyvinyl propionate, polyvinyl butyrate, and the like. The preferred polyvinyl ester is polyvinyl acetate.

The polyvinyl alcohol used in accordance with this invention may be a homopolymer or a copolymer. When the polyvinyl alcohol is derived from a polyvinyl ester homopolymer, it is generally referred to as a polyvinyl alcohol homopolymer, regardless of whether it is partially or fully hydrolyzed; that is, whether only a portion or all of the acyl groups in the original polyvinyl ester have been replaced by hydroxyl groups.

When the polyvinyl alcohol is derived from a polyvinyl ester copolymer, it is generally referred to as a polyvinyl alcohol copolymer. The term "copolymer", as used throughout the specification and claims, is intended to include polymers derived from two or more copolymerizable monomers, for example, dipolymers, terpolymers, etc. The polyvinyl alcohol copolymer may be partially or fully hydrolyzed; that is, only a portion or all of the hydrolyzable acyl groups in the original copolymer may have been replaced by hydroxyl groups.

In any event, at least about 50 mole percent of the monomeric units in the resulting polyvinyl alcohol, whether it be a homopolymer or a copolymer, should be vinyl alcohol units. In the case of a polyvinyl alcohol homopolymer, this means that the polyvinyl alcohol should be at least about 50 mole percent hydrolyzed. When less than about 50 mole percent of the monomeric units in the polyvinyl alcohol are vinyl alcohol units, the polyvinyl alcohol may no longer have sufficient water solubility or hydroxyl functionality to be suitable for forming a microgel in accordance with this invention. Preferably, at least about 85 mole percent, and more preferably, at least about 93 mole percent of the monomeric units in the polyvinyl alcohol are vinyl alcohol units.

Any ethylenically unsaturated monomer which will copolymerize with vinyl acetate may be used for preparing polyvinyl alcohol copolymers. Typical monomers include alpha, beta-unsaturated aliphatic hydrocarbons such as ethylene, propylene, butylene, isobutylene, hexene, dodecene, octadecene, and the like; unsaturated lower-aliphatic mono- and di-carboxylic acids such as acrylic, methacrylic, maleic, maleic anhydride, fumaric, itaconic, and the like; lower-alkyl esters of unsaturated lower-aliphatic mono- and di-carboxylic acids such as the methyl, ethyl, propyl, isopropyl, butyl, isobutyl, and tert.-butyl esters of acids such as acrylic, methacrylic, maleic, fumaric, itaconic, and the like; vinyl esters of saturated aliphatic acids such as vinyl formate, vinyl propionate, vinyl butyrate, vinyl pivalate, vinyl versatate, and the like; vinyl lower-alkyl esters such as methyl vinyl ether, ethyl vinyl ether, tert.-butyl vinyl ether, and the like; unsaturated aliphatic amides such as acrylamide, methacrylamide, dimethyl acrylamide, and the like; substituted amino lower-alkyl esters of unsaturated lower-aliphatic acids such as dimethylaminoethyl acrylate and methacrylate, diethylaminoethyl acrylate and methacrylate, diisopropylaminoethyl acrylate and methacrylate, and the like; and unsaturated aliphatic amines such as vinylamine which is obtained by copolymerizing with vinyl succinimide and treating with strong caustic, and the like.

The molecular weight of the polyvinyl alcohol should be such as to provide a Hoeppler viscosity of about 4 to 150 centipoises. The Hoeppler viscosities referred to herein are measured as a 4 percent aqueous solution at 20°C. by the falling ball method using a Hoeppler viscosimeter. This procedure is described in the Hoeppler Precision Viscosimeter Operating Manual published by the Fish-Schurman Corp.

When the molecular weight of the polyvinyl alcohol corresponds to a viscosity of less than about 4 centipoises, uneconomically large amounts of crosslinking agent are necessary to cause microgel formation. When the molecular weight of the polyvinyl alcohol corresponds to a viscosity in excess of about 150 centipoises, formation of the microgel is difficult to control, in that significant amounts of solid gel are formed. Preferably the molecular weight corresponds to a Hoeppler viscosity of about 10 to 70 centipoises.

The preferred polyvinyl alcohols are those which have a Hoeppler viscosity of about 20 to 40 centipoises and in which at least about 93 mole percent of the monomeric units are vinyl alcohol units. One class of particularly preferred polyvinyl alcohols are homopolymers which are at least about 99 mole percent hydrolyzed. another particularly preferred class of polyvinyl alcohols are copolymers derived about 94 to 98 percent by weight from vinyl acetate and about 2 to 6 percent by weight from methyl methacrylate and which are at least about 99 mole percent hydrolyzed.

In the polymer mixture with the polyvinyl alcohol is one or more polysaccharide selected from the group consisting of starch and sodium carboxymethylcellulose. The term "starch", as used herein, is intended to include natural starches of all descriptions, and derivatives thereof. Suitable starches include corn starch, potato starch, amylose starch, pearl starch, hydroxyethylated starches, oxidized starches, carboxymethylated starches, oxidized carboxymethylated starches, and the like. The degree of polymerization of sodium carboxymethyl cellulose is determined by measuring the Brookfield viscosity of an aqueous solution in accordance with test method D-1439-65 of the American Society for Testing Materials (ASTM).

The polymer mixture contains at least about 0.5 percent by weight of polyvinyl alcohol and up to about 99.5 percent by weight of starch and/or up to about 33 percent by weight of sodium carboxymethylcellulose. One preferred mixture contains about 5 to 40 percent by weight of polyvinyl alcohol, 60 to 95 percent by weight of starch, and 0 to 10 percent by weight of sodium carboxymethylcellulose. Another preferred mixture contains about 67 to 95 percent by weight of polyvinyl alcohol and about 5 to 33 percent by weight of sodium carboxymethylcellulose.

The dry blends of this invention contain as a second component a water-soluble, solid titanium salt of a hydroxy carboxylic acid of 2 to 10 carbon atoms. Suitable acids include hydroxy mono-, di-, and tri-carboxylic acids such as lactic, tartaric, citric, salicyclic, and the like. The preferred salt is titanium citrate.

The titanium salt should be present in an amount which provides about 0.05 to 10 parts by weight of tetravalent titanium ions per 100 parts of polymer mixture. Preferably the titanium salt is present in an amount which provides about 0.1 to 2 parts by weight of tetravalent titanium ion per 100 parts of polymer mixture.

The third essential component of the dry blends of this invention is a water-soluble, solid hydroxy carboxylic acid of 2 to 10 carbon atoms. Suitable acids are the same as those listed above in connection with the titanium salts. The preferred acid is citric acid.

The amount of hydroxy carboxylic acid in the dry blend should be about 0.05 to 20 parts by weight per 100 parts of polymer mixture. Preferably, the acid is present in the amount of about 0.2 to 10 parts by weight per 100 parts of polymer mixture.

The dry blends of this invention may also contain other ingredients which make them especially suitable for a particular use. For example, when the microgel is to be used for paper or paperboard sizing, it may be desirable to incorporate into the precursor blend a finely divided filler such as clay or calcium carbonate, or a pigment such as titanium dioxide.

The dry blends of this invention are prepared by mixing together in proper proportions each of the solid ingredients in finely divided form. Conventional mixing equipment such as tumble blenders or fluidized bed mixers are suitable for preparing these blends.

Polyvinyl alcohol-containing microgels are prepared by first dissolving the dry precursor blend of this invention in water at the proper concentration. The dry blend should be added to water in an amount which provides an aqueous mixture containing about 0.05 to 10 percent by weight of polymer mixture. Preferably the aqueous mixture contains about 1 to 8 percent by weight of polymer mixture and most preferably about 2 to 6 percent.

This aqueous mixture is then reacted thereby partially crosslinking the polymer mixture with the titanium ions to form a stable, fluid polyvinyl alcohol microgel in water having a Brookfield viscosity of about 1.15 to 1000 centipoises, said viscosity being at least about 15 percent greater than the viscosity of the aqueous polyvinyl alcohol solution from which the microgel is derived. This percent increase in viscosity is determined by measuring the Brookfield viscosity of the aqueous polymer mixture at the same temperature and concentration before and after it is partially crosslinked to form the microgel. Preferably, the microgel has a Brookfield viscosity of about 25 to 1000 centipoises, and most preferably about 35 to 500 centipoises. The Brookfield viscosities referred to herein are determined at 25°C. using a Brookfield Viscometer, Model RVT, operating at 100 revolutions per minute as described in the manual from Brookfield Engineering Laboratories, Inc.

The polyvinyl alcohol microgels may also be prepared by forming the titanium salt in situ rather than by using the premixed dry precursor blend. For example, the mixture of titanium lactate and lactic acid may be obtained by adding tetraisopropyl titanate and excess lactic acid. In this case, the addition of a little alcohol helps the titanate go into solution.

In some cases the pH must be adjusted before the titanium salt will react with the polymer mixture. For example, when using titanium citrate, the pH should be adjusted to about 6 to 10 and preferably about 7 to 9. In the case of titanium lactate, pH control is not necessary for microgel formation, although more efficient use of the titanium ion can be achieved by pH control. Suitable water-soluble alkaline materials for controlling pH include the hydroxides and orthosilicates of alkali metals such as lithium, sodium, potassium, and the like; ammonium hydroxide; and the hydroxides of alkaline earth metals such as calcium, strontium, and barium; and the like. Sodium and ammonium hydroxides are preferred.

When using the principle of this invention which involves the use of free hydroxy carboxylic acid, a significantly higher microgel viscosity is achieved at a given level of titanium ion than would be achieved in the absence of the acid. Since the titanium salt is the most expensive ingredient in the system, the presence of the free acid leads to a more economical system for achieving a given viscosity.

EXAMPLES OF THE INVENTION

The following examples, illustrating the novel dry blends of this invention and the method of preparing microgels in the presence of excess hydroxy carboxylic acid, are given without any intention that the invention be limited thereto. All parts and percentages are by weight. In each of these examples the Hoeppler viscosities given for the various polyvinyl alcohols refer to a 4 percent solution at 20°C.

EXAMPLE 1

Three grams of the polyvinyl alcohol which was 99.5 percent hydrolyzed and had a Hoeppler viscosity of 30 centipoises were dry mixed with 0.26 gram of titanium citrate, 0.30 gram of a semi-refined, low viscosity sodium carboxymethylcellulose (Du Pont T-75-L), 15 grams of a hydroxyethylated starch, and 0.19 gram of citric acid monohydrate. This dry blend was dissolved in hot water and the solution was made up with water to a total weight of 300 grams at 25°C. The resulting solution had a pH of 3.3 and a Brookfield viscosity of 54 centipoises. To the solution was then added 2 ml. of concentrated ammonium hydroxide. The resulting microgel was a uniform, viscous fluid having a Brookfield viscosity of 108 centipoises.

For comparison the above procedure was followed except that the sodium carboxymethylcellulose used was a premium refined, low viscosity sodium carboxymethylcellulose (Du Pont P-75-L). The resulting solution had a pH of 3.4 and a Brookfield viscosity of 15 centipoises. Upon addition of 2 ml. ammonium hydroxide the pH was 9.7 and the Brookfield viscosity was 115 centipoises. After standing in open air for 2 days the Brookfield viscosity remained at 115 centipoises.

For comparison, a dry blend was made up in the same manner as above but without the citric acid monohydrate. The 300 grams of resulting aqueous solution had a Brookfield viscosity of 56 centipoises and a pH of 4.1. The addition of 2 ml. of concentrated ammonium hydroxide produced a uniform fluid having a Brookfield viscosity of only 76 centipoises and a pH of 9.7.

EXAMPLE 2

Fifteen grams of a hydroxyethylated starch, 3 grams of a polyvinyl alcohol which was 99.5 percent hydrolyzed and had a Hoeppler viscosity of 30 centipoises, 0.3 gram of titanium citrate, and 0.16 gram of citric acid monohydrate were dry mixed together. This dry blend was then dissolved in hot water and the solution made up with water to a total of 300 grams at 25°C. The resulting solution had a pH of 3.0 and a Brookfield viscosity of 48 centipoises. To the solution was added three ml. of concentrated ammonium hydroxide. The resulting microgel was a uniform, viscous fluid having a Brookfield viscosity of 70 centipoises.

EXAMPLE 3

Nine grams of a polyvinyl alcohol which was 99.5 percent hydrolyzed and had a Hoeppler viscosity of 30 centipoises, 0.3 gram of a premium refined medium viscosity sodium carboxymethylcellulose (Du Pont P-75-M), 0.11 gram of titanium citrate, and 0.08 gram of citric acid were dry mixed together. The dry blend was dissolved in hot water and the solution made up to 300 grams total weight with water at 60°C. The solution had a pH of 4.8 and a Brookfield viscosity of 32 centipoises. To the solution was added three ml. of concentrated ammonium hydroxide. The resulting microgel was a uniform, viscous fluid having a Brookfield viscosity at 25°C. of 62 centipoises, and had a pH of 10.9.

I claim:

1. A dry blend for forming a stable, fluid polyvinyl alcohol containing microgel in water having a Brookfield viscosity of 1.15 to 1000 centipoises which comprises (A) a polymer mixture consisting of at least about 0.5 percent by weight of polyvinyl alcohol and one or more polysaccharide selected from the group consisting of up to 99.5 percent by weight of starch and up to 33 percent by weight of sodium carboxymethylcellulose, said polyvinyl alcohol having a Hoeppler viscosity of 4 to 150 centipoises measured as a 4 percent aqueous solution at 20°C. by the falling ball method and having at least 50 mole percent of the monomeric units present as vinyl alcohol units, (B) water-soluble, solid titanium salt of a hydroxy carboxylic acid of 2 to 10 carbon atoms in an amount which provides 0.05 to 10 parts by weight of tetravalent titanium ion per 100 parts of said polymer mixture, and (C) 0.05 to 20 parts by weight of water-soluble, solid hydroxy carboxylic acid of 2 to 10 carbon atoms per 100 parts of said polymer mixture.

2. The dry blend of claim 1 in which the polyvinyl alcohol has a Hoeppler viscosity of 10 to 70 centipoises and at least 85 mole percent of the monomeric units in the polyvinyl alcohol are vinyl alcohol units.

3. The dry blend of claim 2 in which the polyvinyl alcohol has a Hoeppler viscosity of 20 to 40 centipoises, at least 93 mole percent of the monomeric units in the polyvinyl alcohol are vinyl alcohol units, the titanium salt is present in an amount which provides 0.1 to 2 parts by weight of tetravalent titanium ions per 100 parts of polymer mixture, and the hydroxy carboxylic acid is present in the amount of 0.2 to 10 parts by weight per 100 parts of polymer mixture.

4. The dry blend of claim 3 in which the polyvinyl alcohol is a homopolymer which is at least 99 mole percent hydrolyzed.

5. The dry blend of claim 4 in which the titanium salt is titanium citrate and the hydroxy carboxylic acid is citric acid.

6. The dry blend of claim 5 in which the polymer mixture contains 5 to 40 percent by weight of polyvinyl alcohol, 60 to 95 percent by weight of starch, and 0 to 10 percent by weight of sodium carboxymethylcellulose.

7. The dry blend of claim 5 in which the polymer mixture contains 67 to 95 percent by weight of polyvinyl alcohol and 5 to 33 percent by weight of sodium carboxymethylcellulose.

* * * * *